United States Patent
Abileah (10) Patent No.: US 7,372,510 B2
(45) Date of Patent: May 13, 2008

(54) REFLECTION RESISTANT TOUCH SCREENS

(75) Inventor: Adiel Abileah, Portland, OR (US)

(73) Assignee: Planar Systems, Inc., Beaverton, OR (US)

( * ) Notice: Subject to any disclaimer, the term of this patent is extended or adjusted under 35 U.S.C. 154(b) by 648 days.

(21) Appl. No.: 10/376,155

(22) Filed: Feb. 28, 2003

(65) Prior Publication Data

US 2003/0222857 A1 Dec. 4, 2003

Related U.S. Application Data

(60) Provisional application No. 60/361,238, filed on Mar. 1, 2002.

(51) Int. Cl.
*G02F 1/1335* (2006.01)
*G09G 5/00* (2006.01)

(52) U.S. Cl. .......................... 349/12; 349/96; 349/112; 349/117; 349/137; 345/173

(58) Field of Classification Search .................. 349/12, 349/64, 96, 112, 117, 137, 173; 359/599, 359/485, 494, 497, 500, 501; 345/104, 173, 345/174–176; 178/18.03, 18.05, 18.06, 18.07
See application file for complete search history.

(56) References Cited

U.S. PATENT DOCUMENTS

| | | | |
|---|---|---|---|
| 4,427,741 A * | 1/1984 | Aizawa et al. ............... 428/332 |
| 4,786,767 A | 11/1988 | Kuhlman | |
| 5,680,185 A | 10/1997 | Kobayashi et al. | |
| 6,020,945 A | 2/2000 | Sawai et al. | |
| 6,395,863 B2 * | 5/2002 | Geaghan ..................... 528/196 |
| 6,490,012 B1 * | 12/2002 | Takatani ...................... 349/12 |
| 6,590,622 B1 * | 7/2003 | Nakanishi et al. ............. 349/12 |
| 6,777,102 B2 * | 8/2004 | Sakurai et al. .............. 428/521 |
| 2001/0019479 A1 * | 9/2001 | Nakabayashi et al. ........ 362/31 |
| 2002/0033919 A1 * | 3/2002 | Sanelle et al. .............. 349/122 |
| 2002/0130849 A1 * | 9/2002 | Ahn et al. ................... 345/173 |

FOREIGN PATENT DOCUMENTS

JP 2000-131667 * 12/2000

* cited by examiner

Primary Examiner—Toan Ton
Assistant Examiner—Tai Duong
(74) Attorney, Agent, or Firm—Chernoff, Vilhauer, McClung & Stenzel (57) ABSTRACT

A flexible, non-birefringent cover and a polarizer on the front of a resistive touch panel reduce touch screen image distortion and obscuration resulting from the reflection of ambient light. Reduced reflection of ambient light is also obtained by touch screens of alternative construction incorporating combinations anti-reflection panels and polarizers located behind the touch panel.

52 Claims, 9 Drawing Sheets

| | | TOUCH SCREEN CONSTRUCTION | | | | |
|---|---|---|---|---|---|---|
| Screen No. | Light Valve Polarizer (Material) | Antireflection Panel 1 -Coated Panel Material- | Antireflection Panel 2 -Coated Panel Material- | Touch Panel Polarizer | Anti-Glare-Touch Panel Front | Antireflection Panel 3 -Coated Panel Material- |
| 1 | Birefringent | NO | NO | NO | NO | NO |
| 2 | Birefringent | NO | NO | NO | YES | NO |
| 3 | Birefringent | Birefringent | NO | NO | NO | NO |
| 4 | Birefringent | Birefringent | NO | NO | YES | NO |
| 5 | Birefringent | Birefringent | Birefringent | NO | NO | NO |
| 6 | Birefringent | Birefringent | Birefringent | NO | YES | NO |
| 7 | Birefringent | Birefringent | Birefringent | NO | NO | Birefringent |
| 8 | Birefringent | Birefringent | Birefringent | NO | NO | Anti-Glare Birefringent |
| 9 | Birefringent | NO | NO | YES | NO | Anti-Glare Birefringent |
| 10 | Non-birefringent | NO | NO | NO | NO | NO |
| 11 | Non-birefringent | NO | NO | NO | YES | NO |
| 12 | Non-birefringent | Birefringent | NO | NO | NO | NO |
| 13 | Non-birefringent | Birefringent | NO | NO | YES | NO |
| 14 | Non-birefringent | Birefringent | Birefringent | NO | NO | NO |
| 15 | Non-birefringent | Birefringent | Birefringent | NO | YES | NO |
| 16 | Non-birefringent | Birefringent | Birefringent | NO | NO | Birefringent |
| 17 | Non-birefringent | Birefringent | Birefringent | NO | NO | Anti-Glare Birefringent |
| 18 | Non-birefringent | NO | NO | YES | NO | NO |
| 19 | Non-birefringent | NO | NO | YES | YES | NO |
| 20 | Non-birefringent | Non-birefringent | NO | YES | NO | NO |
| 21 | Non-birefringent | Non-birefringent | NO | YES | YES | NO |
| 22 | Non-birefringent | Non-birefringent | Non-birefringent | YES | NO | NO |
| 23 | Non-birefringent | Non-birefringent | Non-birefringent | YES | YES | NO |
| 24 | Non-birefringent | Non-birefringent | Non-birefringent | YES | NO | Birefringent |
| 25 | Non-birefringent | Non-birefringent | Non-birefringent | YES | NO | Anti-Glare Birefringent |

TABLE 1A

TABLE 1B

| Screen No. | SPECULAR REFLECTANCE BY COMPONENT (%) ||||||| Reflectance Total (%) |
|---|---|---|---|---|---|---|---|
| | Light Valve Polarizer | Antireflection Coating - Light Valve Polarizer | Antireflection Coating Touch Panel Back | Touch Panel Polarizer | Anti-Glare-Touch Panel Front | Antireflection Coating Touch Panel Front | |
| 1 | 0.60 | 4.00 | 4.00 | 0 | 0 | 4.00 | 12.60 |
| 2 | 0.60 | 4.00 | 4.00 | 0 | 50 | 4.00 | 10.60 |
| 3 | 0.60 | 0.50 | 4.00 | 0 | 0 | 4.00 | 9.10 |
| 4 | 0.60 | 0.50 | 4.00 | 0 | 50 | 4.00 | 7.10 |
| 5 | 0.60 | 0.50 | 0.50 | 0 | 0 | 4.00 | 5.60 |
| 6 | 0.60 | 0.50 | 0.50 | 0 | 50 | 4.00 | 3.60 |
| 7 | 0.60 | 0.50 | 0.50 | 0 | 0 | 0.50 | 2.10 |
| 8 | 0.60 | 0.50 | 0.50 | 0 | 50 | 0.50 | 1.85 |
| 9 | 0.60 | 4.00 | 0.25 | 64 | 50 | 0.25 | 0.61 |
| 10 | 0.60 | 4.00 | 4.00 | 0 | 0 | 4.00 | 12.60 |
| 11 | 0.60 | 4.00 | 4.00 | 0 | 50 | 4.00 | 10.60 |
| 12 | 0.60 | 0.50 | 4.00 | 0 | 0 | 4.00 | 9.10 |
| 13 | 0.60 | 0.50 | 4.00 | 0 | 50 | 4.00 | 7.10 |
| 14 | 0.60 | 0.50 | 0.50 | 0 | 0 | 4.00 | 5.60 |
| 15 | 0.60 | 0.50 | 0.50 | 0 | 50 | 4.00 | 3.60 |
| 16 | 0.60 | 0.50 | 0.50 | 0 | 0 | 0.50 | 2.10 |
| 17 | 0.60 | 0.50 | 0.50 | 0 | 50 | 0.50 | 1.85 |
| 18 | 0.60 | 4.00 | 4.00 | 64 | 0 | 4.00 | 7.10 |
| 19 | 0.60 | 4.00 | 4.00 | 64 | 50 | 4.00 | 5.10 |
| 20 | 0.60 | 0.50 | 4.00 | 64 | 0 | 4.00 | 5.84 |
| 21 | 0.60 | 0.50 | 4.00 | 64 | 50 | 4.00 | 3.84 |
| 22 | 0.60 | 0.50 | 0.50 | 64 | 0 | 4.00 | 4.58 |
| 23 | 0.60 | 0.50 | 0.50 | 64 | 50 | 4.00 | 2.58 |
| 24 | 0.60 | 0.50 | 0.50 | 64 | 0 | 0.50 | 1.08 |
| 25 | 0.60 | 0.50 | 0.50 | 64 | 50 | 0.50 | 0.83 |

TABLE 1C

DIFFUSE REFLECTANCE BY COMPONENT (%)

| Screen No. | Light Valve Polarizer | Antireflection Coating - Light Valve Polarizer | Antireflection Coating Touch Panel Back | Touch Panel Polarizer | Anti-Glare-Touch Panel Front | Antireflection Coating Touch Panel Front | Reflectance Total (%) |
|---|---|---|---|---|---|---|---|
| 1 | 0.17 | 0.06 | 0.10 | 0 | 0 | 0.06 | 0.39 |
| 2 | 0.17 | 0.06 | 0.10 | 0 | 50 | 0.06 | 0.42 |
| 3 | 0.17 | 0.06 | 0.10 | 0 | 0 | 0.06 | 0.39 |
| 4 | 0.17 | 0.06 | 0.10 | 0 | 50 | 0.06 | 0.42 |
| 5 | 0.17 | 0.06 | 0.10 | 0 | 0 | 0.06 | 0.39 |
| 6 | 0.17 | 0.06 | 0.10 | 0 | 50 | 0.06 | 0.42 |
| 7 | 0.17 | 0.06 | 0.10 | 0 | 0 | 0.06 | 0.39 |
| 8 | 0.17 | 0.06 | 0.10 | 0 | 50 | 0.06 | 0.42 |
| 9 | 0.17 | 0.06 | 0.03 | 64 | 50 | 0.03 | 0.14 |
| 10 | 0.17 | 0.06 | 0.10 | 0 | 0 | 0.06 | 0.39 |
| 11 | 0.17 | 0.06 | 0.10 | 0 | 50 | 0.06 | 0.42 |
| 12 | 0.17 | 0.06 | 0.10 | 0 | 0 | 0.06 | 0.39 |
| 13 | 0.17 | 0.06 | 0.10 | 0 | 50 | 0.06 | 0.42 |
| 14 | 0.17 | 0.06 | 0.10 | 0 | 0 | 0.06 | 0.39 |
| 15 | 0.17 | 0.06 | 0.10 | 0 | 50 | 0.06 | 0.42 |
| 16 | 0.17 | 0.06 | 0.10 | 0 | 0 | 0.06 | 0.39 |
| 17 | 0.17 | 0.06 | 0.10 | 0 | 50 | 0.06 | 0.42 |
| 18 | 0.17 | 0.06 | 0.10 | 64 | 0 | 0.06 | 0.18 |
| 19 | 0.17 | 0.06 | 0.10 | 64 | 50 | 0.06 | 0.21 |
| 20 | 0.17 | 0.06 | 0.10 | 64 | 0 | 0.06 | 0.18 |
| 21 | 0.17 | 0.06 | 0.10 | 64 | 50 | 0.06 | 0.21 |
| 22 | 0.17 | 0.06 | 0.10 | 64 | 0 | 0.06 | 0.18 |
| 23 | 0.17 | 0.06 | 0.10 | 64 | 50 | 0.06 | 0.21 |
| 24 | 0.17 | 0.06 | 0.10 | 64 | 0 | 0.06 | 0.18 |
| 25 | 0.17 | 0.06 | 0.10 | 64 | 50 | 0.06 | 0.21 |

| Screen No. | TRANSMITTANCE (%) | TOTAL REFLECTED LIGHT (fL) | CONTRAST RATIO |
|---|---|---|---|
| 1 | 88 | 283.2 | 1.70 |
| 2 | 88 | 245.6 | 1.81 |
| 3 | 92 | 213.2 | 1.93 |
| 4 | 92 | 175.6 | 2.13 |
| 5 | 95 | 143.2 | 2.38 |
| 6 | 95 | 105.6 | 2.87 |
| 7 | 99 | 73.2 | 3.68 |
| 8 | 99 | 70.6 | 3.78 |
| 9 | 85 | 23.3 | 8.00 |
| 10 | 88 | 283.2 | 1.70 |
| 11 | 88 | 245.6 | 1.81 |
| 12 | 92 | 213.2 | 1.93 |
| 13 | 92 | 175.6 | 2.13 |
| 14 | 95 | 143.2 | 2.38 |
| 15 | 95 | 105.6 | 2.87 |
| 16 | 99 | 73.2 | 3.68 |
| 17 | 99 | 70.6 | 3.78 |
| 18 | 76 | 156.2 | 2.08 |
| 19 | 76 | 118.6 | 2.42 |
| 20 | 79 | 131.0 | 2.28 |
| 21 | 79 | 93.4 | 2.79 |
| 22 | 82 | 105.8 | 2.59 |
| 23 | 82 | 68.2 | 3.45 |
| 24 | 85 | 35.8 | 5.61 |
| 25 | 85 | 33.2 | 5.96 |

TABLE 1D

REFLECTION RESISTANT TOUCH SCREENS

CROSS-REFERENCE TO RELATED APPLICATIONS

This application claims the benefit of U.S. Provisional Application No. 60/361,238, filed Mar. 1, 2002.

BACKGROUND OF THE INVENTION

The present invention relates to a touch screen display and, more particularly, to a reflection resistant, touch sensitive display.

A touch screen display permits a user to input information to a computer system by touching an icon or other visual element displayed on a screen or by tracing a symbol on a screen to be identified and interpreted by the computer system. Direct user interaction through a touch sensitive screen is considered to be one of the most intuitive methods of computer input. As a result, touch screens have been widely applied to personal digital equipment; to public access data processing systems, such as self-service fuel pumps, automated teller machines and automated ticketing systems; and to instrumentation and controls for medical equipment, aircraft, and vehicles.

Several types of touch screens have developed to address the needs of the wide variety of potential applications. Surface Acoustic Wave (SAW) touch screens comprise a glass panel with acoustic transceivers attached to three corners and reflecting stripes arranged along the edges. The transceivers generate inaudible sound waves that travel across the screen. When a user's finger makes contact with the screen, a portion of the wave's energy is absorbed. The touch screen controller detects the energy loss and calculates the coordinates of the contact. A Near Field Imaging (NFI) touch screen comprises a base layer and a front layer of glass separated by a transparent conductive film deposited in a patterned topology. A controller applies an excitation waveform to the conductive layer to generate a low strength electrostatic field in the front layer of glass. The field is modulated when the glass is contacted by a finger or a conductive stylus, producing a differential signal that is detected and spatially resolved by the controller to determine the location of the contact with the screen.

Capacitive touch screens comprise multiple layers of glass with a thin conductive film between a pair of glass layers. A narrow pattern of electrodes is placed between glass layers. The conductive film may be, for example, patterned indium tin oxide (ITO) or a thin wire mesh. An oscillator circuit attached to each corner of the screen induces a low voltage electric field in the coating. When the glass screen is touched, the properties of the electric field change. The touch screen's controller computes the coordinates of the point of contact with the screen by measuring the relative changes of the electric field at a plurality of electrodes.

The most popular type of touch screen is a resistive touch screen. Resistive touch screens comprise a substantially rigid substrate and a flexible cover each having a surface coated with a transparent conductive material, usually indium tin oxide (ITO). The substrate and cover are bonded together with the conductive surfaces facing each other but separated by an air gap produced by a pattern of transparent insulators deployed on one of the surfaces. When a user presses on the flexible cover, the cover is deformed and the conductive surfaces make contact. A controller measures the voltage drop in circuits resulting from contact between the conductive layers to determine the coordinates of the point at which the contact was made.

Resistive and capacitive touch sensitive systems are typically produced as a transparent, touch-sensitive panel that is placed in front of the screen or display surface of the underlying electronic display. The touch sensitive systems are commonly used in conjunction with several types of displays including cathode ray tubes (CRTs) and liquid crystal displays (LCDs). LCD-based displays are preferred for many touch screen applications because LCDs are lighter, more compact, more rugged, and use less energy than CRT displays.

Generally, an LCD comprises a light valve that controls the intensity of light passing through the panel from a source at the back of the LCD (a "backlight") to a viewer's eyes at the front of the panel. The light valve generally comprises a pair of polarizers separated by layer of liquid crystals filling a cell gap between the polarizers. The optical axes of the two polarizers are arranged relative to each other so that light from the backlight is either blocked or transmitted through the polarizers. The liquid crystals are birefringent and translucent and the relative orientation of the crystals of the layer can be controlled to switch the light valve from a transmitting state where light is transmitted through the two polarizers to a non-transmitting state where light transmission is blocked. For example, the walls of the cell gap may be buffed to create microscopic grooves that orient adjacent molecules of liquid crystal with optical axes of the two polarizers. Liquid crystals exhibit a dipole that attracts neighboring crystals and causing the crystals of columns spanning the liquid crystal layer to align with each other. If the crystals at the limits of the layer are arranged at an angle to each other to align with the optical axis of the polarizers, the crystals of the intervening column will be progressively twisted into alignment by the dipole. The plane of vibration of light transmitted from the first polarizer passing through a column of crystals is also "twisted" so that it is aligned with the optical axis of the second polarizer and visible to the viewer (in a "normally white" LCD). To turn a pixel off and create an image, a voltage is applied to an electrode of an array of electrodes on the walls of the cell gap with reference to a common electrode causing adjacent liquid crystals to be twisted out of alignment with the optical axis of the adjacent polarizer attenuating the light transmitted from the backlight to the viewer. (Conversely, the polarizers of the light valve of a "normally black" LCD are arranged so that the pixel is "off" or "black" when the controlling electrode is not energized and switched "on" or "white" when the electrode is energized.)

While LCDs are the displays of choice for many touch screen applications, the combination of an LCD display device and a touch panel can be problematic. The principal problem is that touch panels are reflective and, when exposed to intense ambient lighting, the luminance of the reflection often overpowers the image being displayed by the LCD.

The reflectivity of a resistive touch panel is principally the result of coating the facing surfaces of the cover and the substrate with the transparent conductive coating of ITO. ITO has a relatively high index of refraction (typically, n=1.83 for light in the green wavelengths) while the index of air in the gap between the resistive surfaces has an index of refraction of 1.0. The percentage of perpendicularly incident light reflected from a discontinuity in the index of refraction is, approximately:

$$R(\%) = \left(\frac{n_2 - n_1}{n_2 + n_1}\right)^2$$

where:

$n_2$=index of refraction for the optically denser material $n_1$=index of refraction for the optically less dense material R=percentage of incident light reflected (It is noted that the aforementioned equation is only accurate for perpendicular viewing directions.) The result of two transitions of the air-to-ITO boundaries by ambient light from the front of the panel is reflection of roughly 17% of the ambient light incident on the panel. This reflection is sufficient to obscure the displayed image under modest to high intensity ambient lighting conditions.

Sawai et al., U.S. Pat. No. 6,020,945, disclose an optical filter for a resistive touch panel that is intended to prevent reflection of external light and obscuration of the displayed image. The optical filter comprises, generally, a filter polarizer in front of the screen of the display. The filter polarizer may be a circular polarizer comprising a combination of a linear polarizer and a quarter wave phase difference plate. Much of the ambient light striking the front of the panel is absorbed by the filter polarizer. In addition, light passing through the filter polarizer and reflecting from the ITO layers passes twice through a quarter wave phase difference plate. The phase difference plate alters the polarization of the reflected light so that the reflected light is blocked by the filter polarizer.

On the other hand, the linear polarized light of the image from the LCD light valve is circular polarized by a second phase difference plate before passing through the touch panel. The optical axis of a circular polarizing, filter polarizer is aligned so that the circular polarized light from the LCD is transmitted through the filter polarizer to the viewer. While a touch panel filter reduces reflection of ambient light, the combination of the filter polarizer and phase difference plates substantially attenuates the light from the light valve reducing the brightness of the image, and the combination of the touch panel and filter substantially distort the image.

What is desired, therefore, is a touch screen providing substantially reduced reflection of ambient light and an undistorted image.

BRIEF DESCRIPTION OF THE DRAWINGS

TABLE 1A is a table of alternate reflection resistant touch screen constructions indicating arrangements and characteristics of touch screen elements.

TABLE 1B is a table of the specular reflection contributions from the components of the touch screens of alternate construction described in TABLE 1A.

TABLE 1C is a table of the diffuse reflection contributions from the components of the touch screens of alternate construction described in TABLE 1A.

TABLE 1D is a table illustrating the optical performance of the touch screens of alternate construction described in TABLE 1A.

DETAILED DESCRIPTION OF THE INVENTION

Figure 1:
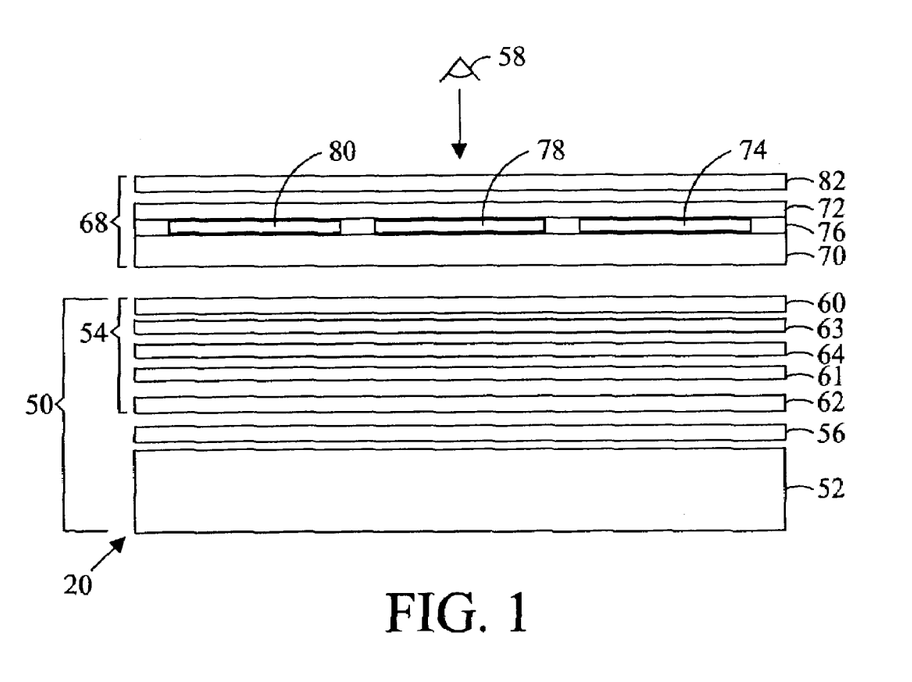
FIG. 1 is an exploded cross-section of a touch screen comprising a resistive touch panel and an associated liquid crystal display (LCD).
Figure 2:
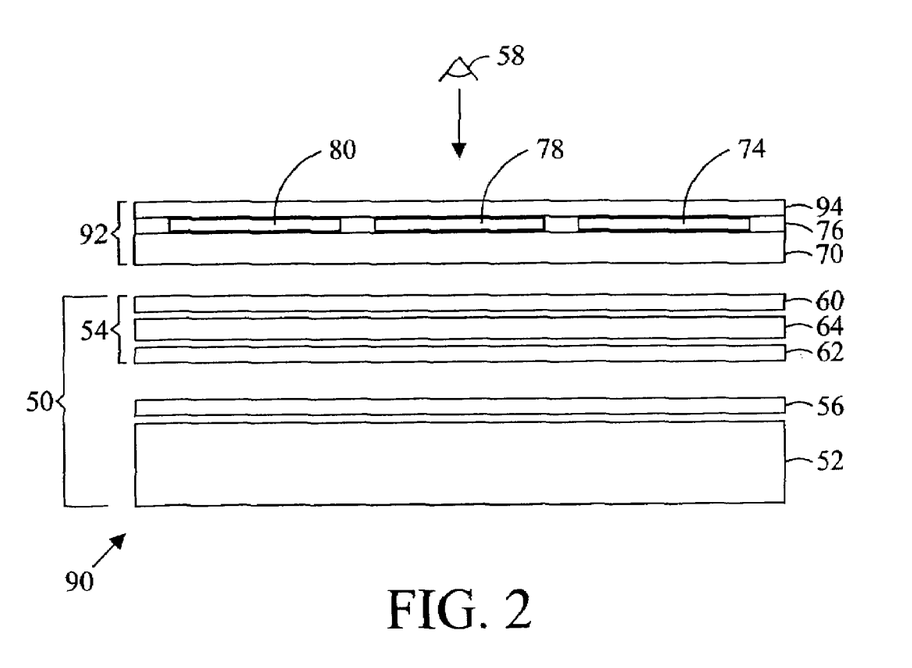
FIG. 2 is an exploded cross-section of a touch screen comprising a resistive touch panel of alternative construction and an associated liquid crystal display (LCD).

Referring to FIGS. 1 and 2 (like elements are identified by common item numbers), a touch screen generally comprises a transparent touch sensitive panel 68 (indicated by a bracket) which is installed proximate to the display screen of a computer operated display, such as a liquid crystal display (LCD) 50 or a cathode ray tube (CRT) monitor. A user can see the displayed image through the touch panel and interact with the computer system by touching the front surface of the touch panel at a location designated by the computer with the display of an icon or other visible indicator. Typically, touch panels and displays are produced as separate units and are often supplied by different manufacturers.

A liquid crystal display (LCD) 50 (indicated by a bracket) comprises generally, a backlight 52 and a light valve 54 (indicated by a bracket). Since liquid crystals do not emit light, most LCD panels are backlit with flourescent tubes or arrays of light-emitting diodes (LEDs) that are built into the sides or back of the panel. To disperse the light and obtain a more uniform intensity over the surface of the display, light from the backlight 52 typically passes through a diffuser 56 before impinging on the light valve 54.

The transmittance of light from the backlight 52 to the eye of a viewer 58, observing an image displayed on the front of the panel, is controlled by the light valve 54. The light valve 54 comprises a pair of polarizers 60 and 62 separated by a layer of liquid crystals 64 contained in a cell gap between the polarizers. Light from the backlight 52 impinging on the first polarizer 62 comprises electromagnetic waves vibrating in a plurality of planes. Only that portion of the light vibrating in the plane of the optical axis of a polarizer can pass through the polarizer. In an LCD light valve, the optical axes of the first 62 and second 60 polarizers are typically arranged at an angle so that light passing through the first polarizer would normally be blocked from passing through the second polarizer in the series. However, the orientation of the translucent crystals in the layer of liquid crystals 64 can be locally controlled to either "twist" the vibratory plane of the light into alignment with the optical axes of the polarizers, permitting light to pass through the light valve creating a bright picture element or pixel, or out of alignment with the optical axis of one of the polarizers, attenuating the light and creating a darker area of the screen or pixel.

The surfaces of a first glass plate 63 and a second glass plate 51 form the walls of the cell gap and are buffed to produce microscopic grooves to physically align the molecules of liquid crystal 64 immediately adjacent to the walls. Molecular forces cause adjacent liquid crystal molecules to attempt to align with their neighbors with the result that the orientation of the molecules in the column of molecules spanning the cell gap twist over the length of the column. Likewise, the plane of vibration of light transiting the column of molecules will be "twisted" from the optical axis of the first polarizer 62 to a plane determined by the orientation of the liquid crystals at the opposite wall of the cell gap. If the wall of the cell gap is buffed to align adjacent crystals with the optical axis of the second polarizer, light from the backlight 52 can pass through the series of polarizers 60 and 62 to produce a lighted area of the display when viewed from the front of the panel (a "normally white" LCD).

To darken a pixel and create an image, a voltage, typically controlled by a thin film transistor, is applied to an electrode in an array of transparent electrodes deposited on the walls of the cell gap. The liquid crystal molecules adjacent to the electrode are attracted by the field produced by the voltage and rotate to align with the field. As the molecules of liquid crystal are rotated by the electric field, the column of crystals is "untwisted," and the optical axes of the crystals adjacent to the cell wall are rotated progressively out of alignment with the optical axis of the corresponding polarizer progressively reducing the local transmittance of the light valve 54 and attenuating the luminance of the corresponding pixel. Conversely, the polarizers and buffing of the light valve can be arranged to produce a "normally black" LCD having pixels that are dark (light is blocked) when the electrodes are not energized and light when the electrodes are energized. Color LCD displays are created by varying the intensity of transmitted light for each of a plurality of primary color (typically, red, green, and blue) sub-pixels that make up a displayed pixel.

The aforementioned example was described with respect to a twisted nematic device. However, this description is only an example and other devices may likewise be used, including, but not limited to, multi-domain vertical alignment (MVA), patterned vertical alignment (PVA), in-plane switching (IPS), and super-twisted nematic (STN) type LCDs.

Figure 3:
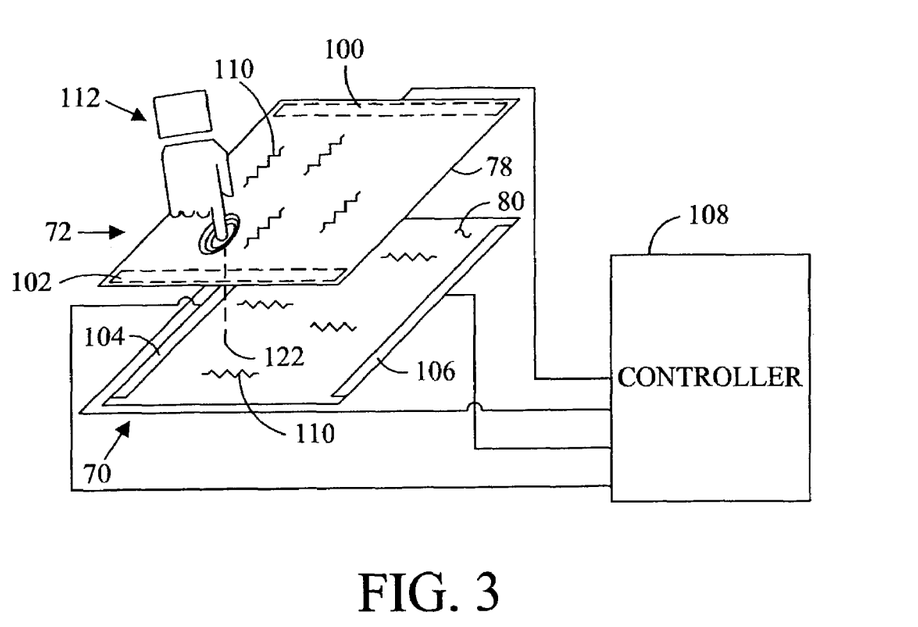
FIG. 3 is a schematic representation of the arrangement of the conductive elements of an exemplary four-wire resistive touch panel.
Figure 4:
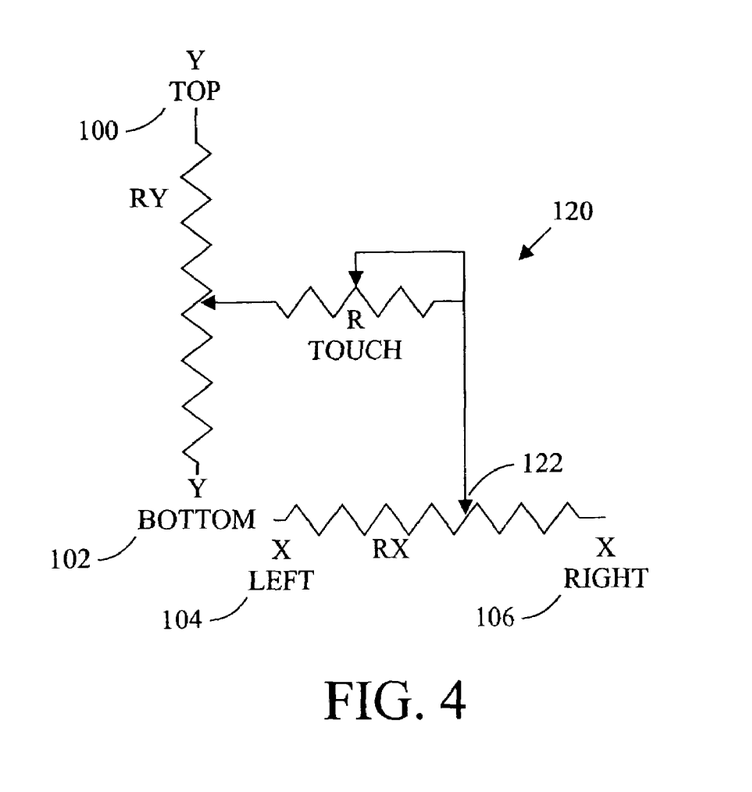
FIG. 4 is an equivalent circuit of an exemplary four-wire resistive touch panel.

Several touch panel technologies are available. Resistive touch panels are typically the least expensive and, therefore, the most common. Referring to FIG. 1, a resistive touch panel 68 (indicated by a bracket) comprises generally a substantially rigid, transparent substrate 70 and a flexible cover 72 that are bonded together but separated by an air gap 74 that is maintained by a plurality of transparent insulators 76 that are deployed between the substrate and the cover. The proximate surfaces 78 and 80 of the substrate 70 and flexible cover 72, respectively, are coated with a transparent conductive material, typically, indium tin oxide (ITO). Referring to FIG. 3, the conductive ITO layers 78 and 80 deposited on the cover 72 and the substrate 70, respectively, comprise resistive conductors between a pair of bus bars at the top 100 and bottom 102 edges of the cover substrate and the right 106 and left 104 edges of the other panel element (e.g., bottom). When a user presses 112 on the flexible cover 72, the cover deforms and the conductive surface layers 78 and 80 make selective contact 122 completing an electrical circuit, as illustrated in FIG. 4.

A touch screen controller 108 determines the coordinates of the point of contact by measuring voltage between points in the circuits that are completed through the conductive surface layers. Resistive touch panels are generally classified as four-wire, five-wire, and eight-wire touch panels according to the number of conductors in the resistive circuit. For example, FIG. 4 illustrates an equivalent circuit 120 of a four-wire resistive touch panel. The controller 108 compares the voltage between either the top bus bar 100 or the bottom bus bar 102 of the first layer and one of the left 104 and right 106 bus bars of the second conductive layer with a reference voltage (top bus bar 100 to bottom bus bar 102) to determine the x-coordinate of the contact point 122. The controller 108 then switches the procedure and determines the y-coordinate of the screen touch by comparing the reference voltage to the voltage between either the right 104 or left 106 bus bar of the second layer and either the top 100 or bottom 102 bus bar of the first layer.

LCD-based touch screens are highly desirable for many applications because an LCD is lighter, more rugged, more energy efficient, and more compact than a CRT. However, a resistive touch panel 68 is very reflective and in modest to high intensity ambient lighting the luminance of the reflection from the touch panel may be sufficient to obscure the image displayed by an LCD.

The readability of an LCD is a function of the luminance (brightness) and contrast of the LCD display and the luminance of the reflected ambient light. While the brightness of the LCD can be increased by increasing the intensity of the backlight, the contrast between light and dark areas of the screen is limited by the ability of the light valve to extinguish light from the backlight to produce darkened pixels. The contrast of the screen is typically specified by the ratio of the contrast of light and dark pixels:

$$CR = \frac{L_W}{L_B}$$

where:
  CR=contrast ratio
  $L_W$=luminance of white state (lighted pixel)
  $L_B$=luminance of black state (darkened pixel)

The contrast ratio is typically specified for a display viewed in a darkened room because of the effect of reflected ambient light on the contrast ratio at a defined viewing angle. For example, an LCD with a white state luminance of 200 nits and a black state luminance of 0.5 nits has a contrast ratio of 400 when viewed in a darkened room. On the other hand, if the LCD is viewed in a well-lit room that produces a glare of 20 nits at the front surface, the white state luminance will be 220 nits, the black state luminance will be 20.5 nits, and the contrast ratio will be 10.7 (220/20.5) substantially less than the contrast ratio for the display in the darkened room. Since the extinction ratio of the light valve and, therefore, the contrast ratio of the LCD in a darkened room are essentially fixed, increasing the brightness of the backlight to overcome the effects of ambient light reflections produces limited improvements in the readability of the display. Reducing the reflection of ambient light from a touch panel without significantly reducing the brightness or the contrast ratio of the displayed image can significantly improve the readability of LCD displays used in environments with higher intensity ambient lighting.

Ambient light impinging on the front of a touch screen passes through the transparent layers of the touch panel and the LCD. Light is reflected when it crosses the boundary between two materials that have differing indices of refraction. For example, the high reflectivity of the resistive touch panel is principally the result of the interaction of ambient light with the resistive coating on the proximate surfaces 78 and 80 of the substrate 70 and cover 72 of the touch panel. Indium tin oxide (ITO) is commonly used to create the transparent conductive surfaces on the substrate and cover. ITO has a high index of refraction (typically, n=1.83 for light in the green wavelengths) while the air in the gap between the resistive surfaces has an index of refraction of 1.0. As a result of transiting the air-ITO interface, a substantial portion of the ambient light impinging on the front of the panel is reflected back to the viewer 58.

A polarizer 82 arranged in front of the touch screen can significantly reduce the reflection of ambient light. The ambient light randomly vibrates in all planes, but only that portion of the light vibrating in the plane of a polarizer can pass through the polarizer. As a result, a polarizer in front of the touch screen substantially reduces the light reaching the ITO interfaces for reflection back to the viewer 58. If the optical axis of the polarizer 82 on the front of the screen is aligned with the optical axis of the second polarizer 60 of the light valve 54 transmission of the image from the light valve is maximized. However, adding a polarizer 82 to the front of the touch screen distorts the image. The present inventor concluded that the image distortion is primarily the result of the interaction of the polarized light comprising the image with birefringent materials interposed between the light valve and the polarizer 82. For example, the flexible cover of resistive touch panels is typically manufactured from polyester (PET) which is birefringent as a result of its molecular structure. In addition, the birefringence of a material is altered by the effects of local strain on the molecular structure. When the flexible cover of a resistive touch panel is deformed by contact, stress causes the birefringence of the cover to vary spatially. As a result, the polarizer 82 interferes to varying degrees with the polarized light comprising the image and the image is distorted. The present inventor concluded that reflection of ambient light could be reduced by arranging a polarizer in front of the touch panel and that the image quality could be preserved by avoiding introducing birefringence in the optical path between the light valve 54 and the viewer 58.

In the LCD touch screen 20, the front surface of the touch panel 68 comprises a polarizer 82. The flexible cover 72 of the touch panel 68 comprises a substantially non-birefringent, flexible plastic material, such as polycarbonate (PC), triacetate cellulose (TAC), or polyvinyl alcohol (PVA). Since the cover 72 is substantially non-birefringent, the polarization of light transiting the cover is unaffected by the cover and distortion of the image as a result of interference between the optical axes of the polarizer 82 and stressed areas of the deformed cover 72 is avoided. The birefringence has a retardation, preferably, less than 25; more preferably, less than 15; and yet more preferably, less than 5.

Referring to FIG. 2, the touch panel 92 of an alternative touch screen 90 incorporates a polarizer 94 (indicated by a bracket) comprising a polarizing element 95 supported by and bonded to a first surface of a flexible, non-glass, support layer 97. The support layer 97 comprises a non-birefringent material such as PVA that is bonded to the birefringent polarizing element 95 to form a polarizer 94 that can be substituted for the separate polarizer 82 and cover 72 utilized in touch panel 20. The polarizer 94 is attached to the front of the touch panel 92. The second surface of the support layer 97 proximate to the substrate 70 is coated with ITO to provide the electrical conductivity required for a resistive touch panel. The front surfaces of the polarizers 82 and 92 are typically coated with a material that reduces reflection and repels oil to minimize visual effects of finger touches.

Figure 5:
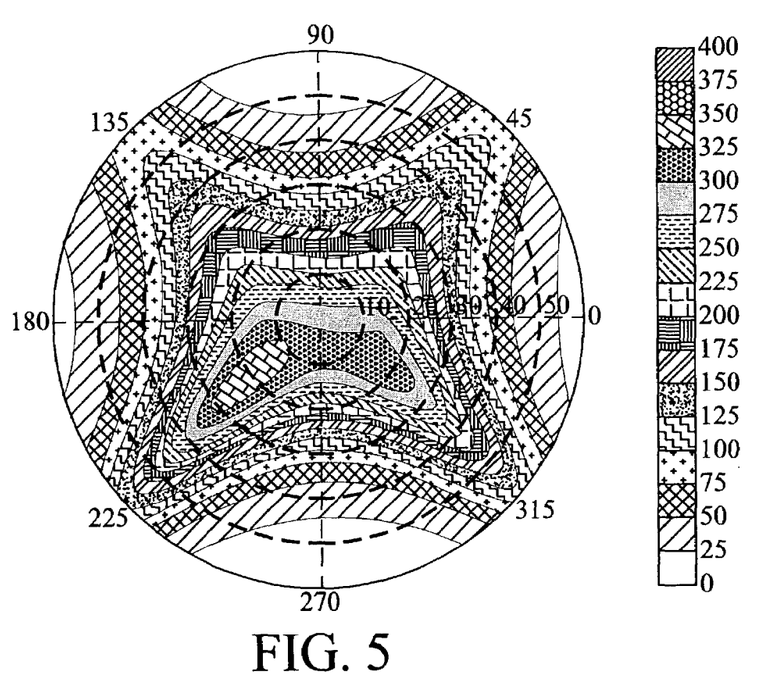
FIG. 5 is an isocontrast plot of the output of an exemplary LCD.
Figure 6:
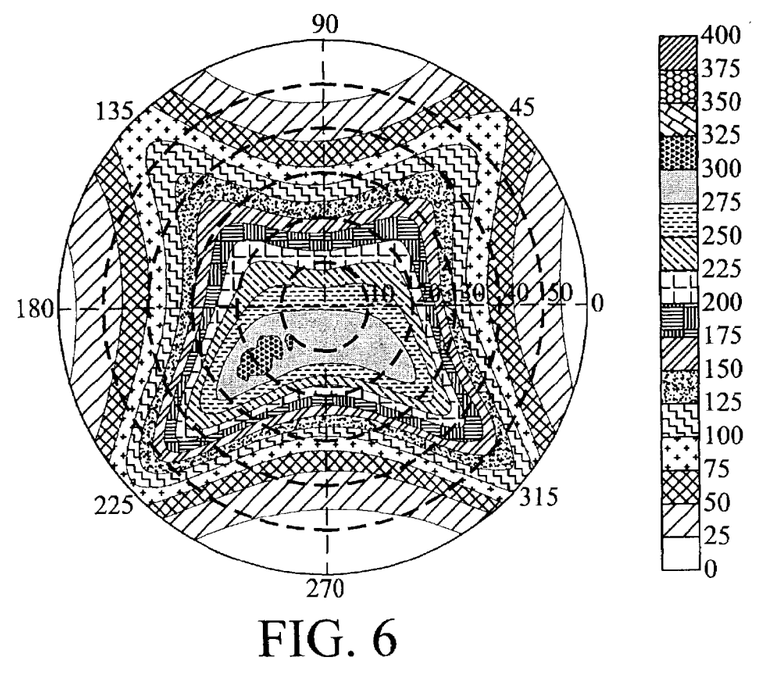
FIG. 6 is an isocontrast plot of the output of a touch screen comprising the exemplary LCD of FIG. 5 and a resistive touch panel.
Figure 7:
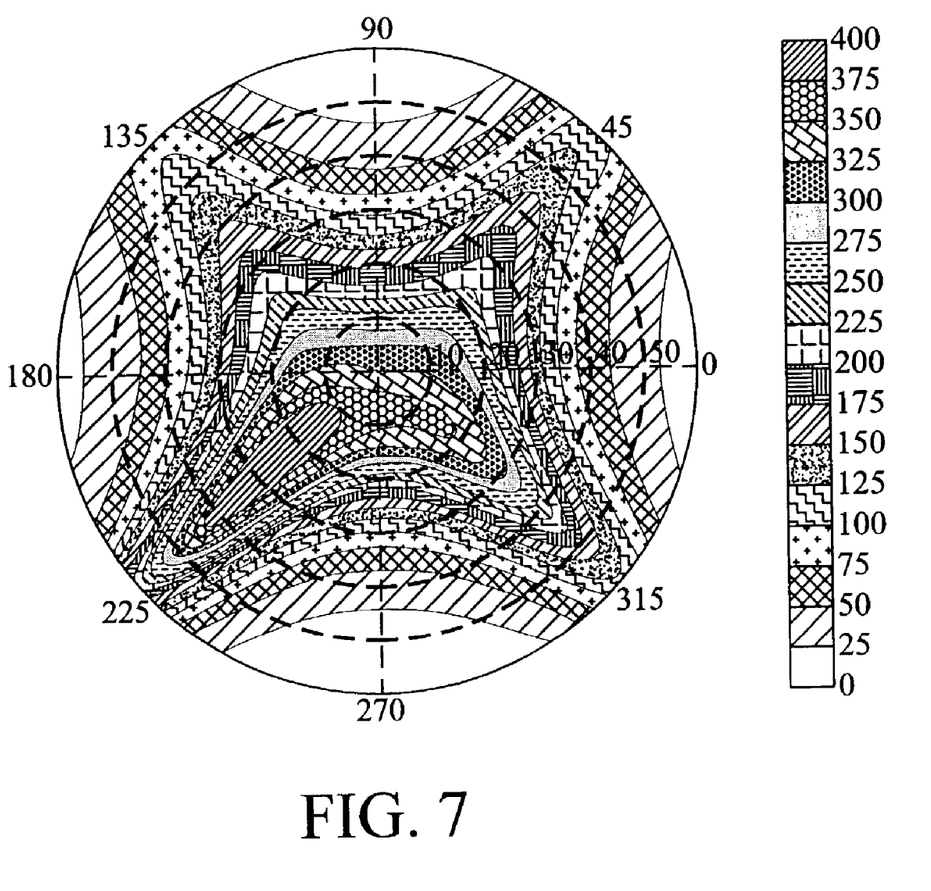
FIG. 7 is an isocontrast plot of the output of a touch screen comprising the exemplary LCD of FIG. 5 and a resistive touch panel including a front polarizer.

Comparison of isocontrast plots for the output of an LCD display without a touch panel 120, see FIG. 5; the LCD equipped a resistive touch panel 122, see FIG. 6; and the LCD equipped with a resistive touch panel including a non-birefringent front cover 124, see FIG. 7, illustrate the improvement in contrast ratio (without image distortion) that can be achieved with the innovative LCD touch screen.

Figure 8:
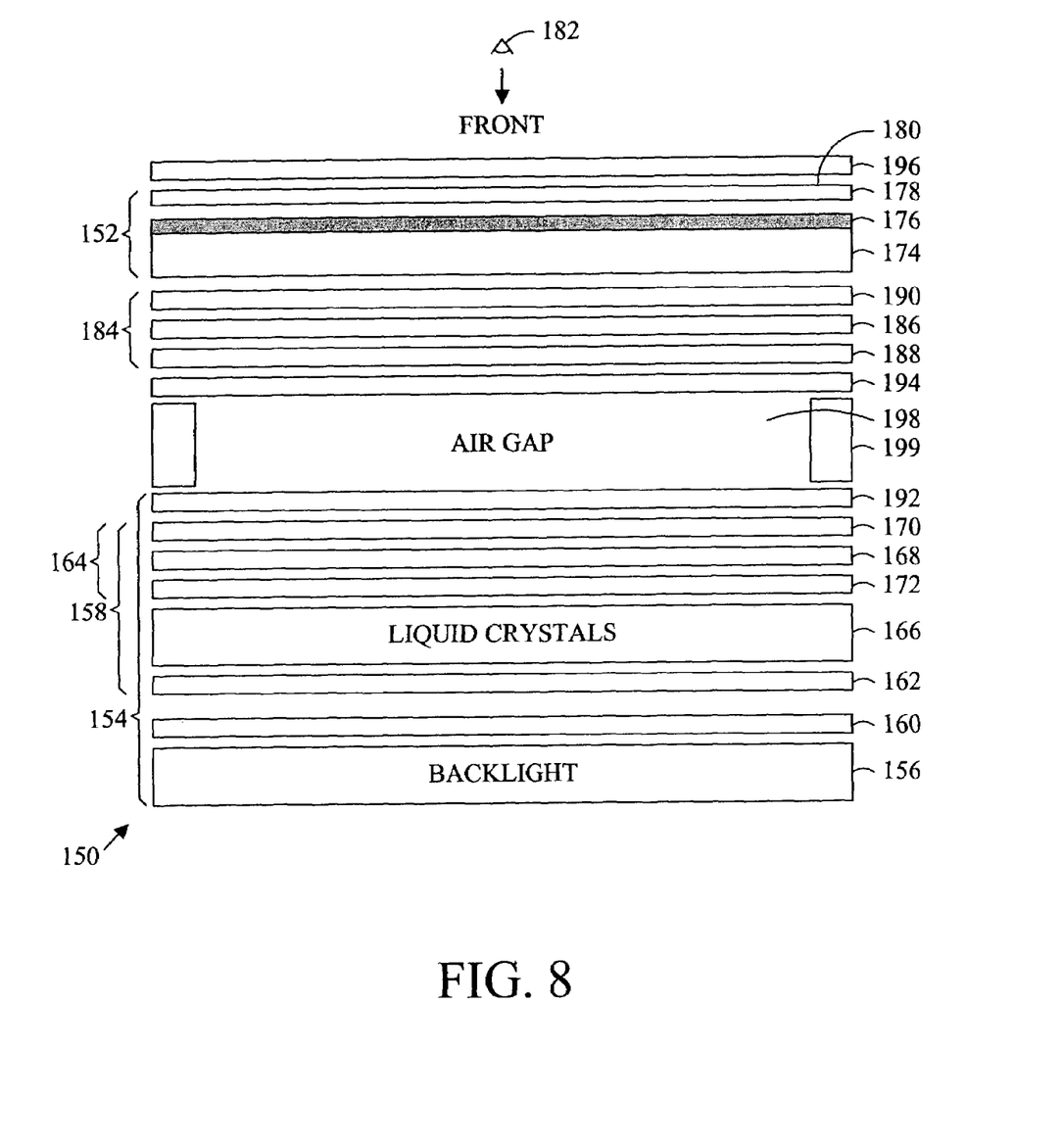
FIG. 8 is an exploded cross-section of a reflection resistant touch screen comprising a capacitive touch panel and an associated LCD.

While the touch panels 68 and 92, including non-birefringent covers and front polarizers, substantially reduce the reflection of ambient light, extending the usefulness of LCD touch screens to environments with higher ambient light intensity, the touch screens have limited usefulness in outdoor applications. The plastic materials typically used in the manufacture of polarizers for LCDs and touch panels deteriorate when exposed to ultraviolet light. FIG. 8 illustrates a touch screen adapted for outdoor use comprising a capacitive touch panel 152 (indicated by a bracket), an LCD 154 (indicated by a bracket), and a plurality of additional components that can be arranged to provide exemplary touch screens 150 of alternate construction that are suitable for exposure to ultraviolet light and reduce reflection of ambient light. Capacitive touch panels are often used in outdoor applications because the touch panel can be sealed to prevent the entry of moisture or other contaminants. In addition, capacitive touch panels are typically constructed from glass panels that provide durability, resistance to scratches, and ultraviolet light (UV) protection for components underlying the glass panels of the touch panel.

The LCD 154 comprises generally, a backlight 156 and a light valve 158 (indicated by a bracket). Light from the backlight 156 is dispersed by a diffuser 160 before impinging on the light valve 158. The light valve 158 comprises a first polarizer 162 and a second polarizer 164 (indicated by a bracket) that are separated by a layer of liquid crystals 166 contained in a cell gap between the polarizers. The orientation of molecules of liquid crystals 166 and the optical axis of the first 162 and second polarizers 164 control the transmission of light from the backlight 156 through the light valve 158.

As illustrated in detail for the second polarizer 164 of the light valve 158, polarizers used in LCD construction typically comprise a polymer-based polarizing layer 168 that is sandwiched between a pair of carrier layers 170 and 172 that provide strength and durability to the polarizer. The carrier layer 170 typically comprise a birefringent material such as polyester and the carrier layer 172 is substantially non-birefringent. In alternative constructions of the reflection resistant touch screen 150, the carrier layers 170 and 172 of the polarizers may comprise a substantially non-birefringent material, such as polycarbonate or triacetate cellulose (i.e., insubstantial x,y birefringence and some birefringence in the z-direction).

The capacitive touch panel 152 comprises a glass substrate 174 with a conductive coating 176 applied to the front surface of the substrate. The conductive patterned surface coating or wire mesh 176 is covered by a protective coating layer 178. When the user contacts the protective coating layer 178, a change in the local capacitance occurs which may be measured by a change in the current drawn and/or the frequency response from the conductive layer. A controller (not illustrated) compares the current flow from a plurality of electrodes at the periphery of the conductive layer to determine the location of the user's contact with the panel.

The protective coating layer 178 for the touch panel 152 may have a glare diffusing front surface 180. Glare is the result of reflection of light at an exposed surface. The reflection from an untreated polished surface is generally specular as in a reflection from a mirror. Typically, antiglare treatments roughen or coat the surface to create a texture that scatters the incident light and cause the reflection to be distributed over a large cone or diffused. Antiglare or glare diffusing surfaces also provide some protection from finger prints and similar surface contamination that may cause readability problems. Glare diffusing surfaces reduce the intensity of the reflected light that reaches the viewer's eyes and is particularly effective in indoor applications where ambient light typically originates from several sources. On the other hand, under direct sunlight it may be relatively easy for a viewer 182 to avoid the intense specular reflection from a single source while the somewhat less intense, but diffuse reflection from a glare diffusing surface may be sufficient to cause readability problems.

To reduce the reflection of ambient light that transits the touch screen 152, the panel may also incorporate a polarizer 184 adjacent to the back surface of the touch panel 152. The polarizer 184 is protected from exposure to ultraviolet light by the glass of the touch panel substrate 174. The polarizer 184 comprises a polarizing layer 186 supported by a pair of carrier layers 188 and 190. The carrier layer 188 of the polarizer 184 may comprise either a birefringent material, such as polyester, or a substantially non-birefringent material, such as polycarbonate or triacetate cellulose, while the carrier layer 188 comprises a substantially non-birefringent material. Ambient light transiting the touch panel 152 comprises light vibrating in a plurality of planes. Since the polarizer 184 will only pass light vibrating in the plane of its optical axis and absorb substantially all of the light vibrating in other planes, a substantial portion of the ambient light transiting the touch panel is absorbed at the polarizer 184. The optical axis of the polarizer 184 is aligned with the optical axis of the second polarizer 164 of the light valve 158 so that the polarized light comprising the image is transmitted through the polarizer 184 to the viewer 182 at the front of the touch screen display 150 with minimum attenuation.

To further reduce reflection of ambient light impinging on the front of the touch screen 152, the touch screen may include one or more anti-reflection panels 192, 194, and 196. A first anti-reflection panel 192 may be interposed between the touch panel 152 and the second polarizer 164 of the light valve. Typically, this anti-reflection panel 192 is adhered to the front surface of the second polarizer 164. A second anti-reflection panel 194 may also be interposed between the light valve 158 and the touch panel 152. The second anti-reflection panel 194 may be proximate to the back side of the glass substrate 174 or the touch panel polarizer 184, if the touch screen is so constructed. The first 192 and second 194 anti-reflection panels may comprise a film of substantially non-birefringent material, such as polycarbonate or triacetate cellulose, coated with an anti-reflection coating and in the case that a polarizer 184 is omitted may also be birefringent material. The anti-reflection coating shifts the relative phase of the light reflected by the upper and lower boundaries of the coating film by 90° so that the reflecting beams destructively interfere and are extinguished. A third anti-reflection panel 196 can be arrayed in front of the touch panel 152 in certain alternate touch screen constructions. The third anti-reflection panel is typically an anti-reflection coating applied to a birefringent film and may have a glare diffusing front surface in some alternate constructions. It is noted that the construction is preferably free from a front polarizer exposed to the air in the front and preferably free from a polarizer between the viewer and the touch panel elements. In this manner the display is more resistant to environmental conditions, such as ultra-violet light. Alternatively, a polarizer may be included in some locations.

TABLE 1A tabulates the characteristics of several components that may be used in constructing several alternate reflection resistant touch screens. TABLES 1B-1D tabulate the effects on the specular and diffuse reflection, the luminance, the reflected light, and the contrast ratio of the touch screen resulting from incorporating components of alternative specification in the touch screen 150. For example, touch screen construction number 1 includes a capacitive touch panel and a second polarizer 164 having a birefringent front carrier layer 170. With no additional reflection reducing components, approximately 284 foot lamberts (fL) of light are reflected comprising specular reflection of 12.6% of the incident ambient light 2000 foot Lambert (fL) and diffuse reflection of approximately 0.4% of the incident 8000 foot candle (fC) ambient light. The touch screen transmits approximately 88% of the image light to the front of the touch screen and has a contrast ratio of 1.70.

To improve the performance of the touch screen in environments with higher levels of ambient lighting a glare diffusing surface treatment is applied to the front surface of the touch panel for alternative touch screen number 2. The glare diffusing surface of alternative touch screen construction number 2 provides a touch screen with an improved contrast ratio resulting from a substantial reduction of specular reflection that is partially offset by a slight increase in diffuse reflection.

Alternate touch screen constructions 3 and 4 include an anti-reflection panel 192, comprising an anti-reflection coated birefringent film, interposed between the light valve 158 and the touch panel 152. The anti-reflection panel 192 reduces the specular reflection of the touch screens relative to screen constructions 1 and 2. An antiglare surface treatment on the front surface of the touch panel of screen number 4, provides additional reduction of the specular reflection with a slight increase in diffuse reflection. Touch screen alternatives 3 and 4 reduce the total reflected light and increase the contrast ratio of the touch screen relative to touch screens 1 and 2.

Alternate touch screen constructions 5 and 6 incorporate a second anti-reflection panel 194 interposed between the light valve 158 and the touch panel 152. Typically, the first anti-reflection panel 192 is associated with the light valve and the second anti-reflection panel 194 is associated with the touch panel 152. The touch screens 5 and 6 further reduce specular reflection relative to touch screens 3 and 4, respectively, providing improved contrast ratios. An antiglare surface on the front of the touch panel is utilized for touch screen number 6 and further reduces specular reflection (at the cost of increased diffuse reflection) for a higher contrast ratio than the construction of screen number 5.

Alternate screen construction number 7 incorporates a third anti-reflection panel in front of the front surface of the touch panel. The addition of the third anti-reflection panel substantially reduces the total light reflected by the screen principally by reducing specular reflection. The contrast ratio is improved relative to screen number 5 and can be further improved by the addition of a glare diffusing surface treatment for the front surface of the third anti-reflection panel as indicated by alternate screen construction number 8.

Alternate touch screen construction number 9 includes a polarizer interposed between the light valve 158 and the touch panel 152 and an anti-reflection panel 196 with antiglare surface treatment in front of the touch panel. The combination of components comprising alternate touch screen construction number 9, provides a fairly high contrast ratio but substantially lower transmittance of the displayed image than provided by alternate touch screen constructions 1-8.

Alternate touch screen constructions 10-25 include a light valve having second polarizer 164 comprising a carrier layer 170 of a substantially non-birefringent material, such as polycarbonate or triacetate cellulose. With no additional reflection reducing components, alternate touch screen construction number 10 provides specular and diffuse reflection and contrast ratio equivalent to screen number 1. Likewise, alternate touch screen construction number 11 which includes an antiglare treatment for the front surface of the touch panel, provides reflection performance and a contrast ratio equivalent to that of touch screen construction number 2.

A first anti-reflection panel 192 comprising a birefringent film coated with an anti-reflection coating is interposed between the light valve 164 and touch panel 152 of touch screen number 10 to produce alternative touch screen construction number 12. The effect of the anti-reflection panel 192 is a reduction in the specular reflection of the touch screen and an improvement in the contrast ratio of the touch screen. A further improvement in the contrast ratio is obtained by applying a glare diffusing surface treatment to the front surface of the touch screen as exemplified by touch screen number 13.

In touch screen numbers 14 and 15 a second anti-reflection panel 194 comprising an anti-reflection coated birefringent film is interposed between the first anti-reflection panel 192 and the capacitive touch panel 152. Typically, the touch panel 152 and the LCD 154 are produced separately and installed so that an air gap 198 is provided between the two components. The air gap 198 may be sealed 199 to prevent the entry of contaminants or the flow of air through the gap may be used to cool the LCD, particularly in outdoor environments subject to heating by sunlight. The first 192 and second 194 anti-reflection panels are applied to the LCD 154 and touch panel 152 respectively on opposing sides of the air gap 199. As illustrated, the specular reflection is reduced and the contrast ratio is increased (relative to screen number 12) by the addition of the second anti-reflection panel to touch screen number 14. Also, as illustrated, an antiglare treatment on the front surface of the touch panel (touch screen number 15) further reduces the specular reflection (at the expense of an increase in diffuse reflection) and improves the contrast ratio over that of touch screen number 14.

A single anti-reflection panel 194 is interposed between the light valve 158 and the touch panel 152 in alternate constructions 16 and 17. However, an anti-reflection panel 196 comprising an anti-reflection coated birefringent polyester film is installed in front of the touch panel 152. Specular reflection is substantially reduced and contrast ratio is increased relative to screens 10-15. A slightly higher contrast ratio results from an antiglare treatment of the surface of the first anti-reflection panel 196 as evidenced by alternate touch screen construction number 17.

A polarizer 184 is included on the back side of the touch panel 152 for alternate touch screen constructions 18-25. Alternative touch screen construction 18 comprises the touch screen construction number 11 with the addition of the polarizer 184 on the back of the touch panel. As illustrated, the polarizer 184 reduces diffuse reflection and substantially reduces the specular reflection, relative to touch screen number 11, by absorbing light that is not vibrating in the plane of the optical axis of the polarizer. The contrast ratio is improved relative to the touch screen construction 11 but even though the optical axes of the second light valve polarizer 164 and the polarizer 184 are aligned, some of the light comprising the image is also absorbed reducing the transmittance of the image. Alternative touch screen construction number 19 adds an antiglare surface treatment to the front surface of the touch panel 152 of touch screen number 18. The result is reduced specular reflection and increased diffuse reflection with a slight improvement in contrast ratio over alternative touch screen construction number 18.

Touch screen constructions 20 and 21 include an anti-reflection panel interposed between the light valve 158 and the touch panel 152 as well as a polarizer on the back surface of the touch panel. The result is a further reduction in the specular reflection and an increase in transmittance and contrast ratio relative to touch screens 18 and 19, respectively. A glare diffusing surface treatment on the front surface of the touch panel 152 permits alternate touch screen number 21 to have a slightly higher contrast ratio than alternate touch screen number 20.

Slightly improved, but similar results are obtained when a second anti-reflection panel 194 is interposed between the touch panel 152 and light valve 158 for touch screen construction alternatives numbers 22 and 23. With the addition of an antiglare surface treatment for the front surface of the touch panel 152 (touch screen number 23), the specular reflection is reduced by approximately 64% and the contrast ratio is approximately doubled compared to touch screen construction number 10.

Adding a third anti-reflection panel 196 in front of the touch panel 152 produces the alternative touch screen constructions (numbers 24 and 25) with the highest contrast ratios. With an antiglare surface treatment on the third anti-reflection panel, the contrast ratio of touch screen 25 is approximately four times that of screen number 10. Although the transmittance of the image is substantially less than that of some of the alternate touch screen constructions, the transmittance of screen number 25 is approximately the same as that of screen number 10 while the total reflected light has been reduced by nearly 90%.

The reflectivity of a touch panel can present problems when applying touch screens in environments with intense ambient lighting. The addition of a polarizer in front of the front touch screen in conjunction with the elimination of birefringence between the light valve and the polarizer substantially reduces the reflection of ambient light. In applications involving direct sunlight, improvements in screen contrast ratio and a reduction in ambient light reflection can be obtained with several touch panel constructions comprising combinations of polarizers behind the touch panel, anti-reflection panels, and glare diffusing surface treatment.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A touch screen comprising:
   (a) a touch panel having a back surface and a front surface;
   (b) a light valve including a polarizer comprising a birefringent carrier layer, said light valve arranged proximate to said touch panel and controlling an intensity of light transmitted through said touch panel;
   (c) another polarizer interposed between said light valve and said touch panel; and
   (d) an anti-reflection panel having a front surface and a back surface, said back surface arranged proximate to said front surface of said touch panel and said front surface comprising a glare diffusing surface.

2. The touch screen of claim 1 wherein said another polarizer comprises a birefringent film.

3. The touch screen of claim 1 wherein said birefringent carrier layer comprises polyester.

4. A touch screen comprising:
   (a) a touch panel having a back surface and a front surface;
   (b) a light valve including a polarizer, said light valve arranged proximate to said touch panel and controlling an intensity of light transmitted through said touch panel;
   (c) another polarizer interposed between said light valve and said touch panel; and
   (d) a first anti-reflection panel interposed between said light valve and said touch panel;
   (e) a second anti-reflection panel interposed between said first anti-reflection panel and said touch panel
   (f) a third anti-reflection panel having a back surface and a glare diffusing front surface, said back surface proximate to said front surface of said touch panel.

5. The touch screen of claim 4 wherein said first anti-reflection panel comprises a birefringent film having an anti-reflection coating.

6. The touch screen of claim 5 wherein said birefringent film comprises polyester.

7. The touch screen of claim 4 wherein said front surface of said touch panel comprises a glare diffusing surface.

8. The touch screen of claim 4 wherein said second anti-reflection panel comprises a birefringent film having an anti-reflection coating.

9. The touch screen of claim 4 wherein said birefringent film comprises polyester.

10. The touch screen of claim 4 wherein said front surface of said touch panel comprises a glare diffusing surface.

11. The touch screen of claim 4 further comprising a third anti-reflection panel proximate to said front surface of said touch panel.

12. The touch screen of claim 11 wherein said third anti-refection panel comprises a birefringent film having an anti-reflection coating.

13. The touch screen of claim 12 wherein said birefringent film comprises polyester.

14. The touch screen of claim 4 wherein said third anti-refection panel comprises a birefringent film having an anti-reflection coating.

15. The touch screen of claim 14 wherein said birefringent film comprises polyester.

16. A touch screen comprising:
   (a) a touch panel having a back surface and a front surface;
   (b) a light valve including a polarizer, said light valve arranged proximate to said touch panel and controlling an intensity of light transmitted through said touch panel;
   (c) another polaraizer comprising a non-birefringent carrier layer interposed between said light valve and said touch panel; and
   (d) a first anti-reflection panel interposed between said light valve and said touch panel;
   (e) another anti-reflection panel having a front side and a back side proximate to said front surface of said touch panel;
   (f) a front surface of said another anti-reflection panel comprises a glare diffusing surface.

17. The touch screen of claim 16 wherein said first anti-refection panel comprises a birefringent film having an anti-reflection coating.

18. The touch screen of claim 17 wherein said birefringent film comprises polyester.

19. The touch screen of claim 16 wherein said front surface of said touch panel comprises a glare diffusing surface.

20. The touch screen of claim 16 further comprising a second anti-reflection panel interposed between said first anti-reflection panel and said touch panel.

21. The touch screen of claim 20 wherein said second anti-refection panel comprises a birefringent film having an anti-reflection coating.

22. The touch screen of claim 21 wherein said birefringent film comprises polyester.

23. The touch screen of claim 20 wherein said front surface of said touch panel comprises a glare diffusing surface.

24. The touch screen of claim 16 wherein said another anti-refection panel comprises a birefringent film having an anti-reflection coating.

25. The touch screen of claim 24 wherein said birefringent film comprises polyester.

26. The touch screen of claim 16 wherein said another anti-refection panel comprises a birefringent film having an anti-reflection coating.

27. The touch screen of claim 26 wherein said birefringent film comprises polyester.

28. The touch screen of claim 16 wherein said another polarizer interposed between said light valve and said back surface of said touch panel is directly attached to said back surface of said touch panel.

29. The touch screen of claim 28 wherein said front surface of said touch panel comprises a glare diffusing surface.

30. The touch screen of claim 16 further comprising an air gap interposed between said light valve and said back surface of said touch panel.

31. The touch screen of claim 16 wherein said first anti-refection panel comprises a substantially non-birefringent film having an anti-reflection coating.

32. The touch screen of claim 31 wherein said substantially non-birefringent film comprises a polycarbonate.

33. The touch screen of claim 31 wherein said substantially non-birefringent film comprises triacetate cellulose.

34. The touch screen of claim 31 wherein said front surface of said touch panel comprises a glare diffusing surface.

35. The touch screen of claim 34 wherein said substantially non-birefringent film comprises a polycarbonate.

36. The touch screen of claim 34 wherein said substantially non-birefringent film comprises triacetate cellulose.

37. The touch screen of claim 36 further comprising a second anti-reflection panel interposed between said first anti-reflection panel and said touch panel.

38. The touch screen of claim 36 wherein said second anti-refection panel comprises a substantially non-birefringent film having an anti-reflection coating.

39. The touch screen of claim 38 wherein said substantially non-birefringent film comprises a polycarbonate.

40. The touch screen of claim 38 wherein said substantially non-birefringent film comprises triacetate cellulose.

41. The touch screen of claim 38 wherein said front surface of said touch panel comprises a glare diffusing surface.

42. The touch screen of claim 41 wherein said substantially non-birefringent film comprises a polycarbonate.

43. The touch screen of claim 41 wherein said substantially non-birefringent film comprises triacetate cellulose.

44. The touch screen of claim 37 further comprising further comprising a third anti-reflection panel having a front surface and a back surface, said back surface arranged proximate to said front surface of said touch panel.

45. The touch screen of claim 44 wherein said third anti-reflection panel comprises a birefringent film having an anti-reflection coating.

46. The touch screen of claim 45 wherein said birefringent film comprises polyester.

47. The touch screen of claim 44 wherein said front surface of said third anti-reflection panel comprises a glare diffusing surface.

48. The touch screen of claim 47 wherein said third anti-reflection panel comprises a birefringent film having an anti-reflection coating.

49. The touch screen of claim 48 wherein said birefringent film comprises polyester.

50. A touch screen comprising:
(a) a touch panel having a back surface and a front surface;
(b) a light valve including a polarizer, said light valve arranged proximate to said touch panel and controlling an intensity of light transmitted through said touch panel;
(c) another polaraizer comprising a non-birefringent carrier layer interposed between said light valve and said touch panel;
(d) a first anti-reflection panel interposed between said light valve and said touch panel;
(e) said first anti-refection panel comprises a substantially non-birefringent film having an anti-reflection coating;
(f) said front surface of said touch panel comprises a glare diffusing surface;
(g) said substantially non-birefringent film comprises triacetate cellulose;
(h) a second anti-reflection panel interposed between said first anti-reflection panel and said touch panel;
(i) a third anti-reflection panel having a front surface and a back surface, said back surface arranged proximate to said front surface of said touch panel;
(j) said front surface of said third anti-reflection panel comprises a glare diffusing surface.

51. The touch screen of claim 50 wherein said third anti-reflection panel comprises a birefringent film having an anti-reflection coating.

52. The touch screen of claim 51 wherein said birefringent film comprises polyester.

* * * * *